(12) United States Patent
Avellan et al.

(10) Patent No.: US 10,027,404 B2
(45) Date of Patent: Jul. 17, 2018

(54) LOOPBACK SATELLITE TRANSPONDER PRE-DISTORTER

(71) Applicant: GLOBAL EAGLE ENTERTAINMENT INC., Los Angeles, CA (US)

(72) Inventors: Abel Avellan, Miami, FL (US); Federico Fawzi, Miramar, FL (US); Sriram Jayasimha, Bangalore (IN); Jyothendar Paladugula, Hyderabad (IN); Kovelapudi Prasad, Hyderabad (IN)

(73) Assignee: GLOBAL EAGLE ENTERTAINMENT INC., Los Angeles, CA (US)

( * ) Notice: Subject to any disclaimer, the term of this patent is extended or adjusted under 35 U.S.C. 154(b) by 0 days.

(21) Appl. No.: 15/141,552

(22) Filed: Apr. 28, 2016

(65) Prior Publication Data

US 2017/0201315 A1    Jul. 13, 2017

Related U.S. Application Data

(60) Provisional application No. 62/276,558, filed on Jan. 8, 2016.

(51) Int. Cl.
*H04B 7/185* (2006.01)
*H04W 52/18* (2009.01)
(Continued)

(52) U.S. Cl.
CPC ......... *H04B 7/18543* (2013.01); *H04B 17/40* (2015.01); *H04L 27/2627* (2013.01); *H04W 52/18* (2013.01); *H04W 84/06* (2013.01)

(58) Field of Classification Search
CPC ............ H04B 7/18517; H04B 7/18528; H04B 7/18543; H04B 17/40; H04W 52/18; H04W 84/06; H04L 27/2627
(Continued)

(56) References Cited

U.S. PATENT DOCUMENTS 6,307,435 B1 * 10/2001 Nguyen ............... H03F 1/3241
                                                              330/149
7,016,644 B2    3/2006 Sun
(Continued)

FOREIGN PATENT DOCUMENTS

WO          01/48998 A1    7/2001

OTHER PUBLICATIONS

Non-linearity effects predistortion in optical OFDM wireless transmission LEDs, Hass et al., Internationnal Journal of Ultra Wideband Communications and Systems, Oct. 2009.*
(Continued)

*Primary Examiner* — Raymond Dean
(74) *Attorney, Agent, or Firm* — SoCal IP Law Group LLP; John E. Gunther; Steven C. Sereboff

(57) ABSTRACT

A high throughput satellite communication system and method of satellite communication that provide loopback capability and increased throughput is disclosed. The satellite communication system and method of satellite communication utilize pre-distortion based on remotely estimated characteristics of a satellite transponder's power amplifier (PA). The pre-distortion is applied to the hub modulator's constellation.

10 Claims, 11 Drawing Sheets

(51) Int. Cl.
  *H04L 27/26*     (2006.01)
  *H04B 17/40*     (2015.01)
  *H04W 84/06*     (2009.01)

(58) Field of Classification Search
  USPC ............... 455/12.1–13.4, 427–430; 370/316
  See application file for complete search history.

(56) References Cited

U.S. PATENT DOCUMENTS

| | | | |
|---|---|---|---|
| 7,522,877 B1* | 4/2009 | Avellan | H04B 7/18517 455/12.1 |
| 8,385,391 B2 | 2/2013 | Balasubramanian et al. | |
| 2002/0164949 A1* | 11/2002 | Beech | H04L 27/368 455/13.4 |
| 2003/0169108 A1 | 9/2003 | Nguyen et al. | |
| 2003/0179830 A1 | 9/2003 | Eidson et al. | |
| 2004/0014437 A1* | 1/2004 | Gerhaeuser | H03F 1/3247 455/114.3 |
| 2009/0052507 A1 | 2/2009 | Eymann | |
| 2010/0284323 A1* | 11/2010 | Tang | H01Q 3/005 370/321 |

OTHER PUBLICATIONS

European Patent Office, European Search Report for European Application No. 16207582.4, dated Apr. 24, 2017, 7 total pages.

* cited by examiner

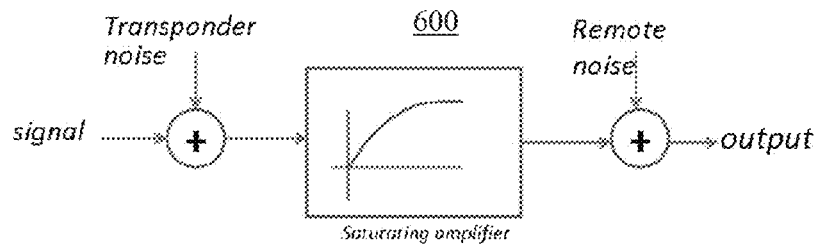
FIG. 6
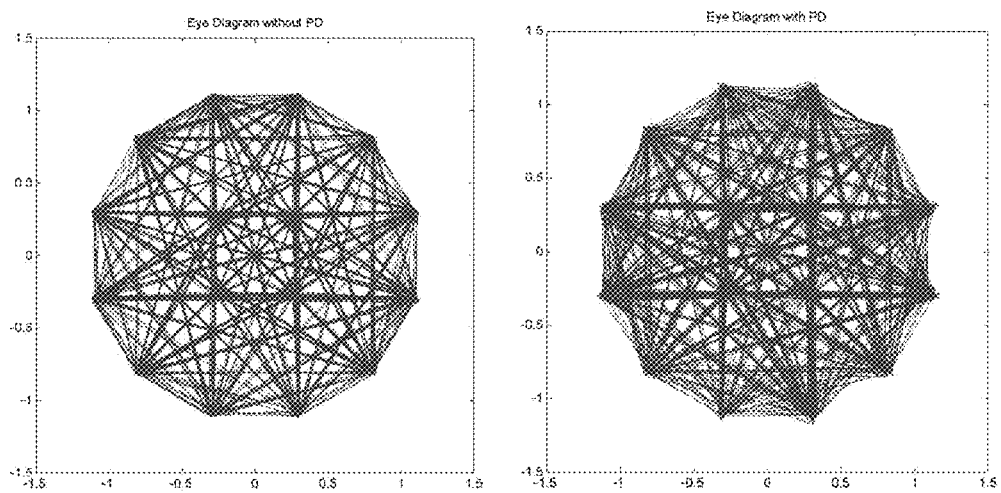
FIG. 7A  FIG. 7B
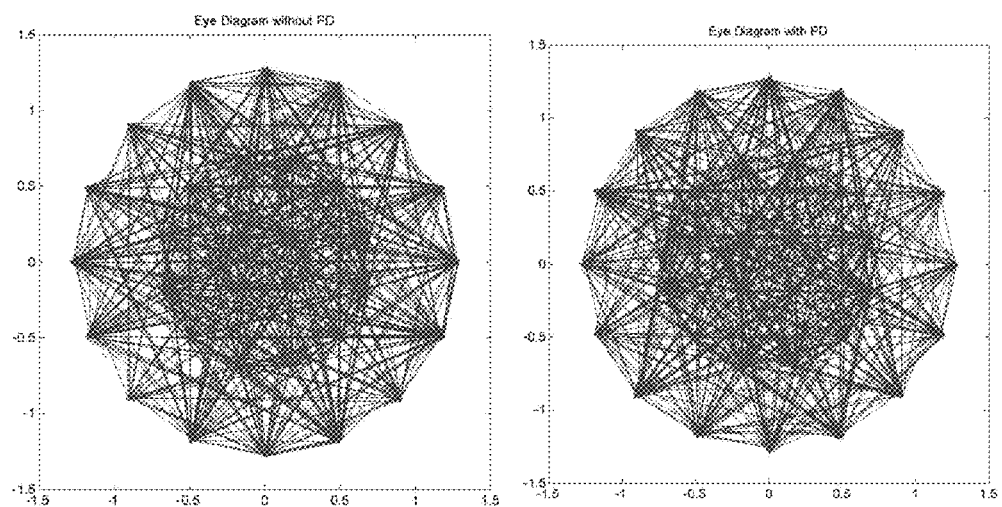
FIG. 8A  FIG. 8B

LOOPBACK SATELLITE TRANSPONDER PRE-DISTORTER

CROSS REFERENCE TO RELATED APPLICATION(S)

This application claims the benefit of U.S. Provisional Application No. 62/276,558, filed Jan. 8, 2016, the entire contents of which are incorporated herein by reference.

FIELD OF THE INVENTION

Embodiments are in the field of satellite communication systems and methods. Specifically, embodiments disclosed herein relate to satellite communication systems with loopback beams to increase throughput by utilizing pre-distortion based on estimated characteristics of a satellite transponder's power amplifier (PA).

BACKGROUND OF THE INVENTION

Pre-distorters (PDs) are commonly used to invert PA non-linearity and are known in the art. However, these pre-distorters are used in scenarios where PD and PA are present in the same module, for instant and accurate feedback of the PA's characteristics to the PD. Unfortunately, these types of PDs do not apply to a satellite transponder configuration, since the ground-based pre-distorter is distant from the satellite transponder's PA.

One approach to utilizing pre-distortion in satellite communication systems is disclosed in U.S. Pat. No. 8,385,391, issued to Balasubramanian, et al. However, it requires the satellite to distinctly transmit the transponder characteristics back to the ground station/hub.

SUMMARY

The technique disclosed herein, in contrast, estimates a loop-back transponder's characteristics at the ground station. It is desirable to provide a satellite communication system capable of remotely estimating a satellite transponder PA's characteristics, then applying pre-distortion to the hub modulator constellation, and that does not need a satellite to transmit its characteristic to a ground station.

The description quantifies the performance gain that a PI) brings, and also the additional demands that the PD makes on other system components. Factors that reduce the potential PD gain are also discussed. These include, for example, the use of overlapped inbound and outbound carriers; transponder noise; and a possible increase in inter-symbol interference (ISI) due to a PD. A discussion of an implementation of PD, and test results are also included below.

Embodiments are directed to a satellite communication system that includes a ground station system in the footprint of a satellite transponder. The satellite transponder includes a satellite transponder PA. The ground station system comprises: a transmitter with a hub modulator that generates normal/pre-distorted hub signal to be transmitted to the satellite; a receiver configured to receive a downlink signal amplified by the satellite transponder's PA and transmitted by the satellite; a self-interference canceller with distortion estimator (SICDE) configured to cancel the hub signal and estimate at least one characteristic of the satellite transponder's PA (as in U.S. Pat. No. 7,522,877, the entire contents of which is hereby incorporated by reference) for pre-distortion by the hub modulator. The non-linear characteristics of PA that may be estimated by the SICDE are a deviation in output amplitude of PA with respect to its input amplitude, called amplitude-to-amplitude modulation (AM-AM) and the deviation in output phase of PA with respect to its input amplitude called amplitude-to-phase modulation (AM-PM).

Embodiments are also directed to a method for satellite communication between a ground station and a satellite transponder. The method comprises comparing, at the ground station, the downlink signal amplified by the satellite transponder's PA and the hub signal that was transmitted to the satellite from the ground station; this analysis estimates at least one characteristic of the satellite transponder's PA. The method also comprises generating a pre-distorted constellation, based on satellite transponder's PA characteristic estimated by the SICDE, for hub signal transmission.

BRIEF DESCRIPTION OF THE DRAWINGS

The detailed description will refer to the following drawings, wherein like reference numerals refer to like elements, and wherein:

FIG. 6 shows a channel model with saturating amplifier;

FIG. 7A shows an eye diagram for the 16-APSK, without the PD;

FIG. 7B shows an eye diagram for the 16-APSK, with the PD;

FIG. 8A shows an eye diagram for the 32-APSK, without the PD;

FIG. 8B shows an eye diagram for the 32-APSK, with the PD;

DETAILED DESCRIPTION OF PREFERRED EMBODIMENTS

The figures and descriptions of the present invention may have been simplified to illustrate elements that are relevant for a clear understanding of the present invention, while eliminating, for purposes of clarity, other elements found in a typical satellite communication system or typical method for satellite communication. Those of ordinary skill in the art will recognize that other elements may be desirable in order to implement the present invention. The drawings included here will only provide diagrammatic representations of the presently preferred structures of the present invention and but in practice they may be different.

Figure 1A:
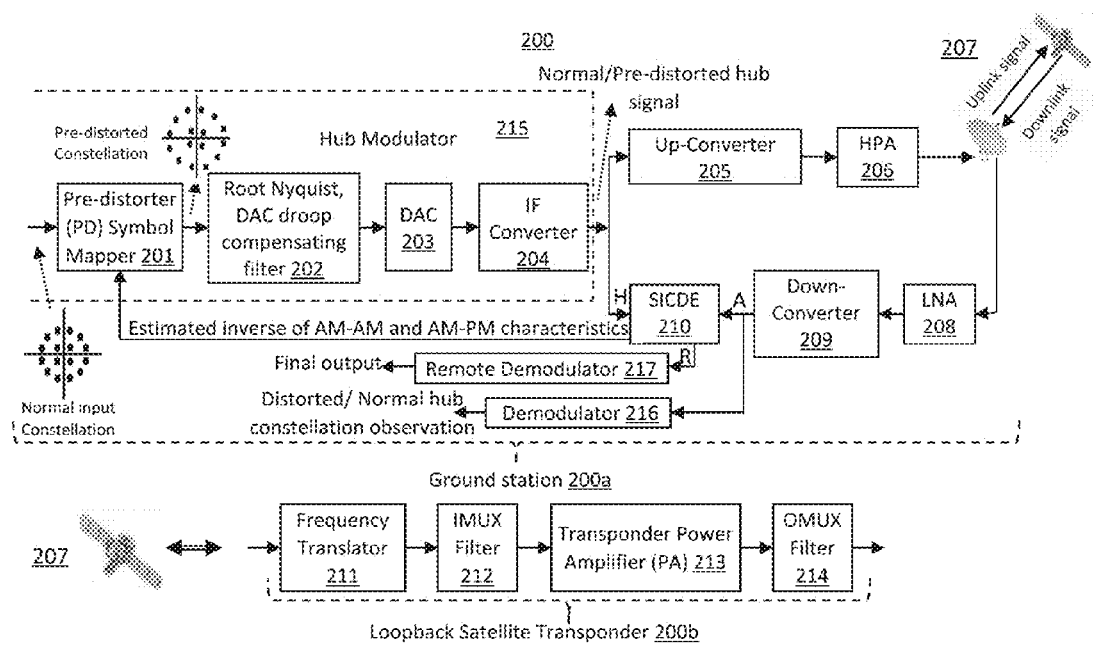
FIG. 1A shows all the components of satellite communication system having a pre-distorter (PD) and transponder power amplifier (PA)

FIG. 1A shows a satellite communication system 200 having a ground station or hub 200a and a satellite transponder 200b. The ground station 200a has a PD 201 and the transponder has a PA 213. The ground station 200a contains transmit and receive sections of the satellite communication system both being in the same satellite foot print. The transmit section includes the hub modulator 215 which generates the hub signal that is to be transmitted to the satellite 207. The hub modulator 215 outputs the hub signal to the up-converter 205, which converts the hub signal 70 MHz, 140 MHz or 950 MHz-1750 MHz L-band range) to the uplink frequency. The high power amplifier (HPA) 206 amplifies the up-converted hub signal and transmits the amplified signal to the satellite 207. As further shown, the satellite transponder 207 translates the frequency 211 of the signal received from the transmitter to the downlink frequency, passes it through the input multiplexer filter (IMUX) 212 to suppress the signals from other transmitters, and amplifies it further using transponder PA 213. The output multiplexer filter (OMUX) 214 then suppresses the spurious signals generated during amplification and transmits it to the receivers which are in the same footprint as the transmitter.

The receive section of the ground station receives the downlink signal from the satellite 207. A low noise amplifier (LNA) 208 is provided to amplify the received downlink signal. A down-converter 209 converts the frequency of the downlink signal to a center frequency (70 MHz, 140 MHz or 950 MHz-1750 MHz L-band range) suitable for processing by the demodulator 216 for signal quality (constellation, signal to noise ratio or Es/No, etc.) verification purposes. The down-converter 209 also passes the signal to the self-interference canceller with distortion estimator (SICDE) 210. The SICDE 210 analyzes the downlink signal (A) received from the satellite with respect to the hub signal transmitted to the satellite (H) to estimate non-linear characteristics of the transponder PA 213 and transfer the inverse characteristics to the hub modulator 215 for pre-distortion of the transmit constellation by the PD 201. The SICDE 210 utilizes the hub signal H and the downlink signal A to estimate the transponder non-linearity. This can be done, for instance, in the manner taught by U.S. Pat. No. 7,522,877 to Avellan, the entire contents of which are hereby incorporated by reference. Accordingly, the SICDE 210 estimates (e.g., in accordance with the '877 patent), the AM-AM and AM-PM curves (i.e., the distortion introduced by the transponder PA 213). The system then uses the inverse to undo the distortion (i.e., by pre-distorting the constellation). The inverse operation is reciprocal in linear scale (such as power of −1) or a negation in logarithmic scale (such as multiplying by −1), as further described in the Implementation section below. Thus, the inverse of the AM-AM and AM-PM characteristics that are estimated by the SICDE 210 is output to the PD 201. The PD 201 can then pre-distort the hub signal to be transmitted.

The hub modulator 215 includes a PD symbol mapper 201 that outputs either normal or pre-distorted constellation for modulation. The square root raised cosine (SRRC) filter 202 meeting DVB-S2 spectral mask limits spectral growth due to PD. The digital modulated data is then converted to analog signal using DAC 203, the IF converter 204 converts it to a nominal center frequency (70 MHz, 140 MHz or 950 MHz-1750 MHz L-band range).

Higher throughput in a hub-satellite-transponder-remote system 200 may be obtained by increasing the hub transmit power (i.e., the power in the uplink signal) at the hub modulator 215. However, the non-linearity in the transponder's PA 213 at higher power levels causes the received signal constellation (at the output of PA, particularly the outer rings) to compress, which reduces its fidelity of the transmitted constellation (compared to the input of PA), resulting in an insufficient gain (or, even a loss) in throughput. The signal constellation generally refers to mapping of the symbols based on amplitude and phase. For example, in QPSK/8-PSK/16-APSK, 2/3/4 bits form one symbol, so their constellation consists of 4/8/16 symbols respectively. In FIG. 1A, the received signal constellation is at the output of the demodulator 216 and the transmit signal constellation is at the input of the PD 201. The demodulator 216 may be used as a test demodulator to verify the output metrics with and without PD.

Figure 2:
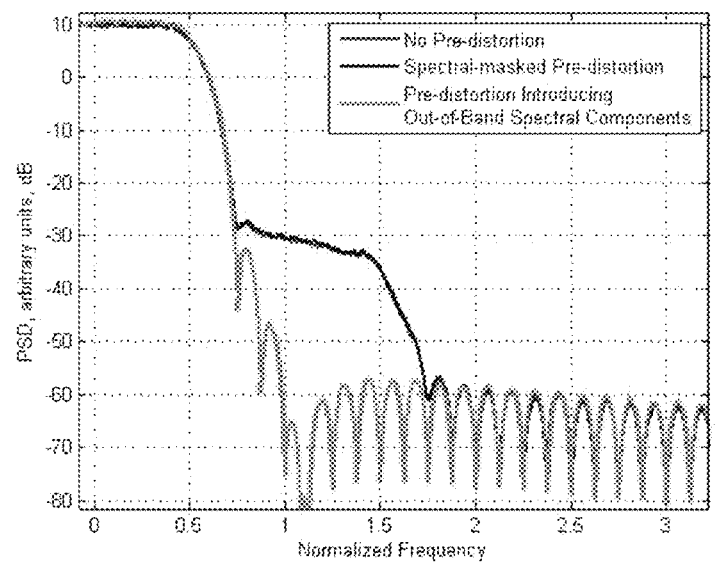
FIG. 2 shows a spectral regrowth at PA output with 32-APSK SRRC (roll-off 35%) transmit filter with: (1) No pre-distortion (line 1); (2) Spectral-masked pre-distortion (line 2); and (3) Pre-distortion introducing out-of-band spectral components (line 3)

Fidelity can be restored by pre-distorting the signal in the hub modulator at the ground station (also called a "hub") 200a, as an inverse of PA distortion (i.e., the non-linearity of the PA 213) at the transponder. With a pre-distorter (PD), the transponder's PA could be driven to higher input (and output) power levels (before saturation inevitably occurs). We can apply pre-distortion in two ways: a) pre-distortion with only in-band components; or b) pre-distortion that introduces both in-band and out-of-band components. The latter type allows to cancel the spectral regrowth at the PA output (FIG. 2). FIG. 2 shows spectral regrowth at PA's output with 32 APSK (Amplitude and Phase-Shift Keying), SRRC (Square Root Raised Cosine with roll-off 35%) transmit filter with: (1) No pre-distortion (line 1); (2) Spectral-masked pre-distortion (line 2); and (3) Pre-distortion introducing out-of-band spectral components (line 3).

An in-band PD cannot reduce the spectral regrowth of the transponder's PA. In order to cancel out-of-band emissions of the transponder's PA, the PD has to generate these out-of-band components. If ground-based HPA distortion were being compensated, such an approach could be considered as long as the HPA's output conformed to the relevant spectral mask. However, we restrict ourselves to an in-band PD for compensating transponder distortion. So, a symbol-level PD is utilized, i.e., the baseband constellation 201 is pre-distorted (at the hub) to negate the AM-AM and the AM-PM of the transponder's PA 213.

Another issue to consider is in-band intermodulation (IM) components generated by the non-linearity (for components $s_1$ and $s_2$ at in-band frequencies $f_1$ and $f_2$, in-band IM components are $(2f_1-f_2)$, $(3f_1-2f_2)$, etc.). These are difficult to cancel (by inserting suitable in-band components out-of-phase with the IM components) given the long time lag (of the order of 150 ms) between the PD and the transponder amplifier and the ionospheric variability of that delay (this depends on the carrier frequency). We therefore do not consider this type of PD in the presented approach. Furthermore, IM components, which usually are much lower than the small-aperture receive antenna noise, do not affect forward channel performance.

In the loop-back transponder 200b, the received uplink signal is translated in frequency, filtered, amplified and then transmitted as a downlink signal. This is in contrast to a regenerative transponder (which is not utilized in the present invention), where the received uplink signal is demodulated using a demodulator (on the satellite) and then re-modulated at different frequency using a modulator (on the satellite) transmit as downlink signal. In the loop-back transponder 200b, the outbound (the hub uplink signal intended for receive by various remotes) and inbound carriers (the signals from various remotes intended for receive by the hub) may be overlapped in frequency at the hub such that the carrier SICDE 210 removes the outbound signal from the aggregate signal. That is, the SICDE 210 cancels the outbound in the overlapped signal by comparing with the transmit signal and outputs R the inbound signals required by the hub to the demodulator 217. Note that in the non-overlapped case, uplink and downlink signals are same; where as in overlapped cases, since the hub and remote uplink frequencies are in the same range, the satellite combines the hub uplink with remote uplink and sends down the overlapped signal as downlink signal.

Operation of the SICDE 210

Figure 1B:
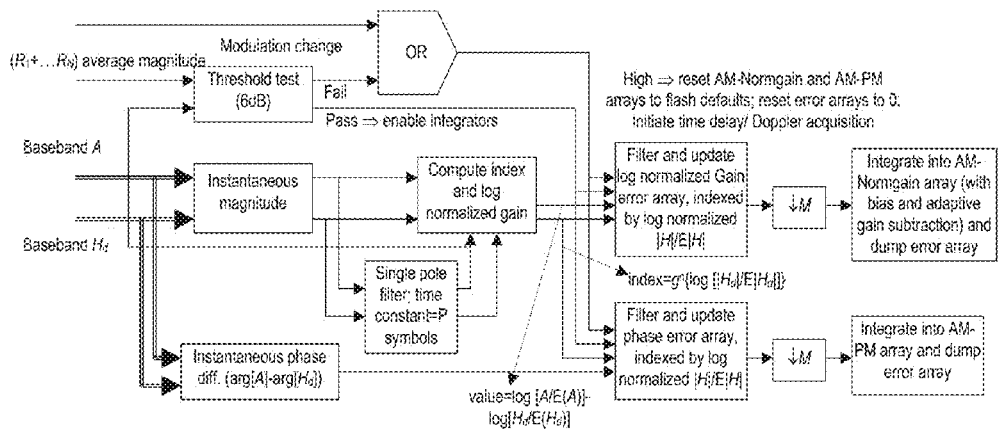
FIG. 1B shows the distortion estimation section of SICDE.

The SICDE 210 receives the transmit signal H and receive signal A, wherein the receive signal A may also contain the inbound carriers in addition to H signal distorted by PA. The SICDE aligns the transmitted signal H and received signal A with respect to amplitude, time, frequency and phase for cancellation of H present in A to retrieve the inbound carriers R for demodulation by the remote demodulator 217, which gives the final output required by the end user. FIG. 1B describes the process by which the signal $H_d$ (H signal aligned in time, amplitude, frequency and phase to A) is used to iteratively update estimates of AM-AM normgain and AM-PM curves. Log normalized |H| is inferred from log normalized $|H_d|$ through fixed-point iteration in the AM-AM normgain array, f, i.e., if $g\{\bullet\}=\{\log(|H_d|/E|H_d|)-f(\bullet)\}$, then fixed-point iteration is $g\{g\{\ldots\}\}=g''(\bullet)$ until $g''\{\log(|H_d|/E|H_d|)\}+f\{g''[\log(|H_d|/E|H_d|)]-\log\ [|H_d|/E|H_d|]$ is less than a resolution threshold (e.g., ⅙ dB) or $g''\{\log(|H_d|/E|H_d|)\}$ exceeds an upper limit 4 dB).

The AM-AM normgain correction array, indexed by log normalized |H|, is updated by filtering (e.g., using a dc unity gain, first-order filter) $\log(|A|/E|A|)-\log(|H_d|/E|H_d|)$. This array is periodically integrated into the AM-AM normgain array, after bias subtraction and adaptive filter gain compensation. AM-PM phase correction array update is based on arg(A)−arg(H).

Finally, to minimize noise effects on the final map, the AM-AM normgain and AM-PM arrays are forced to least probability weighted squares polynomial (e.g., for the non-linear satellite channel, parabolic fits, $y=1-az^2$, $0<a<a_{max}$ and $\phi=bz^2$, $0<b<b_{max}$) of normalized envelopes. The subsequent estimates of parabolic fits are also averaged to minimize the variation due to noise. Hence, the SICDE 210 estimates the non-linearity of the transponder, without having to know or receive the details of PA distortion. It is an estimate because it does not actually receive any details of the PA distortion. The Implementation section below illustrates the AM-AM normgain and AM-PM array estimates of SICDE.

Estimating PD Gain

Figure 3:
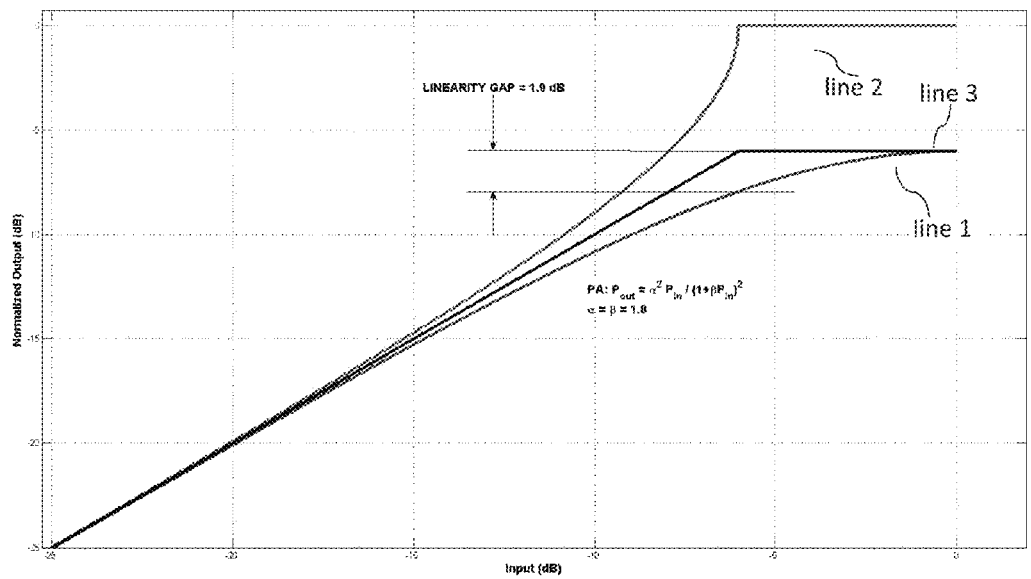
FIG. 3 shows an exemplary PA (line 1), with a corresponding PD (line 2)

The loss due to non-linearity of the PA 213 and the gain restored using PD 201 is now discussed. The PD 201 is a functional map between input and output of the PA 213, and is the inverse of the PA's 213 function. FIG. 3 illustrates PA's saturation (line 1), with a corresponding PD (line 2). The PD cannot grow indefinitely; its output saturates at the input saturation level of the PA. Line 1 is the PA input vs output characteristic, linear response for small input levels (i.e., undistorted output) and saturating/drooping response for higher input levels (i.e., distorted output). Line 2 represents a modified input (input pre-distorted by inverse of the PA function, this operation is called PD). Line 3 represents the resultant linear output when the PD 201 signal is passed through the PA 213. So, if the largest radius of the constellation is in the linear region, fidelity is restored.

The PD's improvement in linearity when operating near the saturation region, is the restoration of the "linearity gap" of 1.9 dB in the exemplary embodiment shown in FIG. 3. The loss caused by a sublinear PA is characterized in three ways: (a) loss in constellation fidelity, (b) loss of receiver SNR, and (c) loss in throughput (i.e., spectral efficiency).

Only AM-AM distortion is considered for analysis; any AM-PM distortion loss is recovered with PD by negating the AM-PM characteristic to the received signal. It is noted that both AM-AM and AM-PM distortion loss is recovered. However, AM-PM distortion does not have effects like out-of-band spurious growth and other issues discussed in the sections below, and therefore only AM-AM distortion is addressed here.

Fidelity Loss Due to a Non-Linear Transponder

Figure 4:
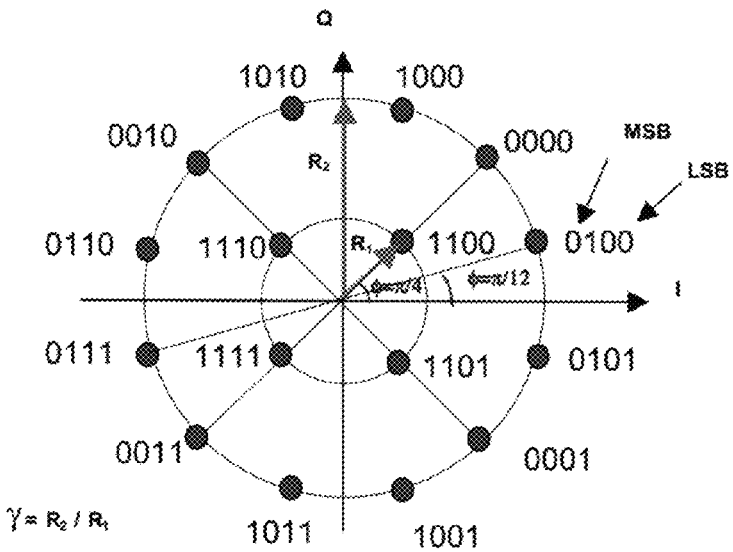
FIG. 4 shows a 16-APSK constellation used by the DVB-S2 standard.

It is noted that near the knee of the saturation characteristic of the transponder's PA, the outer ring of the constellation (at the PA 213 output) gets compressed without PD, resulting fidelity loss of signal. Hence the need for PD. In an exemplary embodiment of the invention, the DVB-S2 16-APSK constellation is used (FIG. 4), with $R_2/R_1$ 3.15. The average and peak powers are $((4R_1^2+12R_2^2)/16)$ and $R_2^2$, so that the peak to average power ratio (PAPR) is 1.1 dB. To operate the outer ring of 16-APSK at the "knee" of the ideal saturating amplifier, the average power must be 1.1 dB below peak power. The mean square error (MSE) for each of the 12 outer points: $(R_2-10^{-1.9/20}R_2)^2$ and for the 4 inner points: Negligible (zero).

Therefore, the total $MSE$ of unsaturated constellation power =

$$\frac{12(R_2-10^{-1.9/20}R_2)^2}{12R_2^2+4R_1^2} = \frac{12(1-10^{-1.9/20})^2}{12+4/3.15^2} = 0.037,$$

Thus, the fidelity loss of 16-APSK without PD is about 3.7% in MSE, or −14 dB, relative to the power of constellation. This result assumes that inbound and the outbound carriers do not overlap (other scenarios are discussed below), and the outer ring is at the input power level of the "knee" of the line 3 of FIG. 3. The outer ring instantaneous power is slightly lower than the "knee" of the line 3 because transponder noise is low. Thus, the back-off with the ideal PA is slightly greater than the PAPR of the constellation.

Back-Off in Single Carrier, Overlapped Carrier and Multicarrier Modes

The amount of back-off required in the transmit chain depends on the uplink carriers on the transponder 200b. Let H be the hub signal's power, R be the remote earth-station's signal power and N be noise power then the total power at the transponder is R+H+N; this quantity must be at the knee of the line 3 of FIG. 3. Table 1 shows the back-off for the various cases.

TABLE 1

Back-off for different cases

| Case | Back-off (dB) |
|---|---|
| Non-Overlapping Carriers, Negligible Transponder Noise | 0 |
| Overlapping Carriers, Remote signal is TDM | $10\log\left(\frac{R+H}{H}\right)$ |
| Overlapping Carriers, Remote signal is multi-carrier | $10\log\left(\frac{R+H}{H}\right)$ + additional back-off to allow for inter-modulation products. |

Back-off, greater than 0 dB implies a reduction in the maximum input drive to the transponder's PA, specifically a reduction in PD's gain. Back-off shown in Table 1 is in addition to the back-off required for accommodating modulation mode and roll-off pulse-shaping mentioned in sections below.

Spectral Efficiency Loss Due to a Non-Linear Transponder's PA

Figure 5:
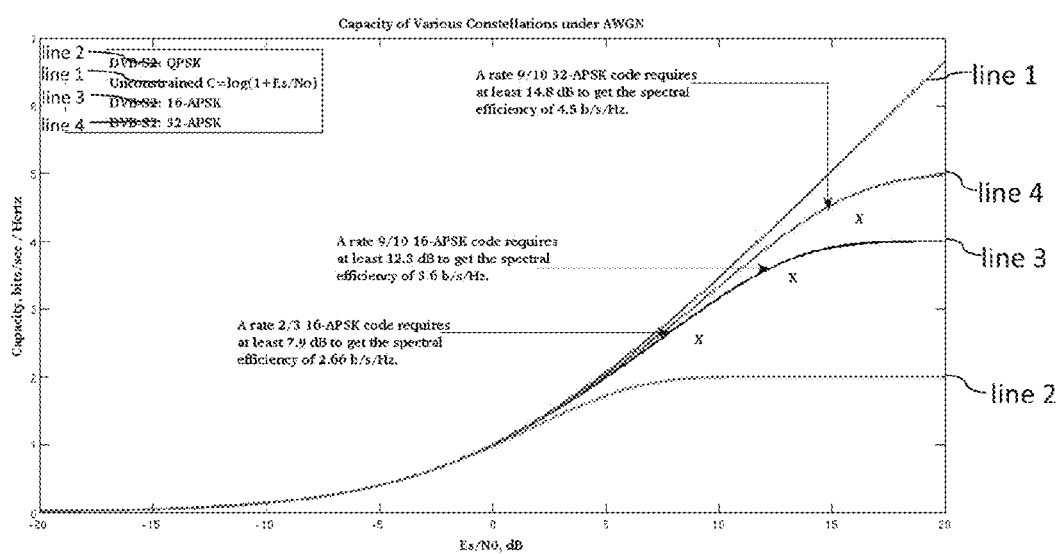
FIG. 5 shows capacities of various constellations under additive white Gaussian noise (AWGN)

Referring to FIG. 5, if the hub-transponder-remote channel is linear AWGN, spectral efficiency would be line 2 (QPSK—Quadrature Phase-Shift Keying), line 3 (16-APSK—Amplitude and Phase-Shift Keying) or line 4 (32-APSK) or more realistically, by X-marks, showing performance with actual error-correcting codes, pilot overhead and estimation errors. FIG. 6 shows a channel model 600 with saturating amplifier.

In FIG. 6, the noise contribution at the transponder is relatively small due to the large aperture-ratio of the hub to remote station antennas, where the SNR is largely determined by the remote antenna's noise temperature. Thus, the channel model of FIG. 6 is a distorted constellation corrupted by AWGN and having a capacity curve, similar to that of FIG. 5 (as the capacity does not depend on constellation shape—unless extreme distortion merges constellation rings). Capacity is computed assuming a theoretically optimal error-correcting code. The capacity of a Gaussian constellation (line 1 of FIG. 5) for low $Es/N_0$ (less than 0 dB), is practically identical to line 3 or line 2. Thus, the loss in throughput is mostly because of $E_s/N_0$ loss caused by the PA.

In case of 16-APSK, the loss in average power due to the constellation passing through the PA (line 1 of FIG. 3) may be computed as 1.8 dB. This is indexed into line 3 of FIG. 5 (at or around a code-rate ⅔, or spectral efficiency of 2.66 b/s/Hz); which shows a decrease in spectral efficiency of 0.4 b/s/Hz, which means 0.4 b/s/Hz or 15% throughput increase due to PD.

This calculation depends on capacity-achieving encoders and decoders. Thus, using a PD improves receiver performance, in the deep saturation example considered, by more than 15%.

In case of 16-APSK, rate 9/10 (3.6 b/s/Hz, at an $E_s/N_0$ of 12.3 dB; line 3 of FIG. 5) an increase in $E_s/N_0$ by 1.8 dB results in an $E_s/N_0$ of 14.1 dB allowing a shift to 32-APSK. At an $E_s/N_0$ of 14.1 dB, 32-APSK (line 4, FIG. 5) yields 4.36 b/s/Hz, increasing throughput by 4.36−3.6=0.76 b/s/Hz, or about 20%, Thus, if the system is operating at the limit of a constellation's spectral efficiency, using a PD may improve performance, by allowing movement to a higher-order modulation.

Accordingly, the capacity vs. modulation code curves are used to understand the reduction in spectral efficiency without PD. As shown in the example, the PD may improve the spectral efficiency by correcting for this loss.

Additional Power Requirements on the Hub's Power Amplifier (HPA)

Pre-distortion increases the average power rating and compression point of hub's PA by 6 dB (line 2 of FIG. 3). The peak power-rating of the HPA is the PAPR of the Pre-distorted constellation (plus the PAPR increase due to SRRC pulse-shaping).

DAC Scaling

The PD 201 will present the DAC 203 with a higher voltage code, requiting the digital signal presented to the DAC to be scaled down by a factor equal to the square-root of the ratio of the peak powers of the pre-distorted and undistorted constellations.

In the example of FIG. 3, the DAC input signal, coming from the PD is scaled down by a factor of $\sqrt{2}$.

PD's Interaction with Automatic Uplink Power Control (AUPC) and Adaptive Coding and Modulation (ACM)

During hub uplink fade (indicated by a fading beacon signal from the satellite), the operating point of the transponder's PA will vary. We disable PD update when beacon power levels vary outside a range, such that AUPC restores the operating point.

ACM typically applies for a remote downlink fade, while the transponder PA's operating point stays unchanged; thus, ACM is independent of distortion estimation. When we enter PD, ACM will likely operate the link at a higher modulation and coding (MODCOD) than without PD.

Fading may be estimated by a self-interference canceller (for a loopback beam. Fade predictions (through either a fade prediction model or real-time earth-observation weather updates) may further improve fade-tracking.

Effect on Eye-Opening with or without PD

Nyquist filtering pulse shapes a symbol so that its zero-crossings appear at other symbols' pulse-centers. Often, a square-root Nyquist filter in transmitter and receiver achieves an overall Nyquist response. In this case, any transponder non-linearity results in a response that is not Nyquist causing ISI. As shown in FIG. 7B timing-jitter with PD causes more ISI (than without PD). The increased ISI and its sensitivity to timing jitter reduces PD gain.

Let the input symbol sequence at the hub's modulator be $I_k$, k be the symbol index, the modulator pulse-shaping filter be p(t), and the amplifier distortion be d(.). The hub's transmitted signal is $$s(t) = \sum_{k=-\infty}^{k=\infty} I_k p(t-kT),$$

where T is the signaling interval. The remote earth station's received signal r(t) is $$r(t)=d(s(t))*q(t)+n(t),$$

where n(t) and q(t) are the receiver noise, and receiver filter.

Consider two cases:
1. The transmit filter p(t) is raised cosine, and the receive filter q(t) is a delta function. The transmit filter is Nyquist, i.e., ISI is zero at integer n multiples of the signaling interval T. The distorted signal d(s(t)) is zero at such times for memoryless distortion. If q(t) is wide-band, it will not change the zero-ISI at that times.
2. Transmit filter p(t) and receiver filter q(t) are SRRC. They are not Nyquist, but the convolution response is Nyquist. In the presence of distortion d, the overall system itself fails to be Nyquist. This causes the distortion function d(.) to introduce ISI at the receiver irrespective of PD.

The eye diagrams of 16-APSK and 32-APSK without and with PD, with SRRC pulse-shaping (Roll-off 0.05) are shown in FIGS. 7A, 7B and 8A, 8B respectively. From the eye diagrams, a slight closing of eye is perceived with PD. Table 2 indicates the increased ISI (6-to-7.5 dB) with PD.

TABLE 2 when a PD is used in conjunction with an SRRC filter at both transmitter and receiver, the ISI at the receiver increases (for the PA of FIG. 3) by about 6-to-7.5 dB. The ISI is measured with reference to the power of the received signal

| SRRC Filter Roll-off | Constellation | ISI without PD (dB) | ISI with PD (dB) |
|---|---|---|---|
| 0.35 | 16-APSK | −36.4 | −29.0 |
| 0.20 | 16-APSK | −33.8 | −26.4 |
| 0.05 | 16-APSK | −33.8 | −26.4 |
| 0.05 | 32-APSK | −35.9 | −30.2 |

Table 2 is derived using the PA of FIG. 3, with a linearity gap of 1.3 dB. Table 2 uses the 16-APSK with $R_2/R_1=3.1$ and 32-APSK with $R_2/R_1=2.84$ and $R_3/R_1=5.27$.

For proper operation, the SNR at the spectral efficiencies targeted by 16-APSK or 32-APSK, should be 20 dB, i.e. thermal noise is at least 20 dB below signal. Adding ISI less than −25 dB below signal due to PD, as indicated in Table 2, would not impact the performance.

Figure 9:
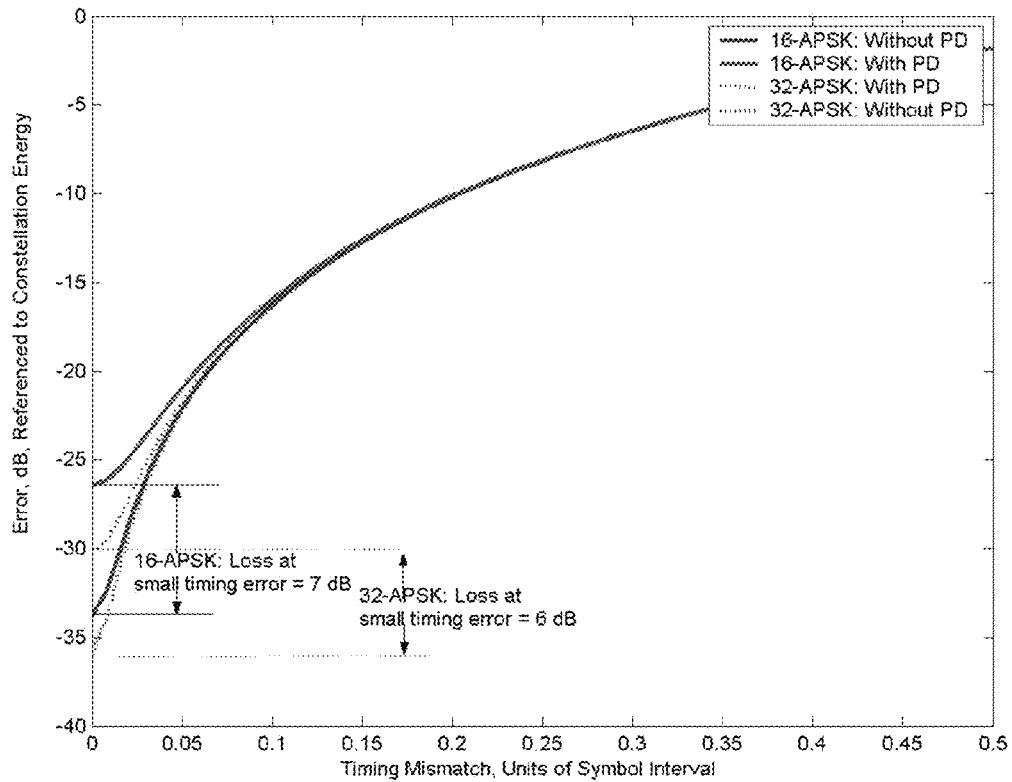
FIG. 9 shows timing mismatch due to PD in the transmit chain (about 6-to-7 dB) at small timing mismatches, on received signal-to-noise ratio (SNR)

FIG. 9 shows an error about 6 to 7 dB at small timing mismatches on received SNR due to PD, but this does not impact performance.

Figure 10:
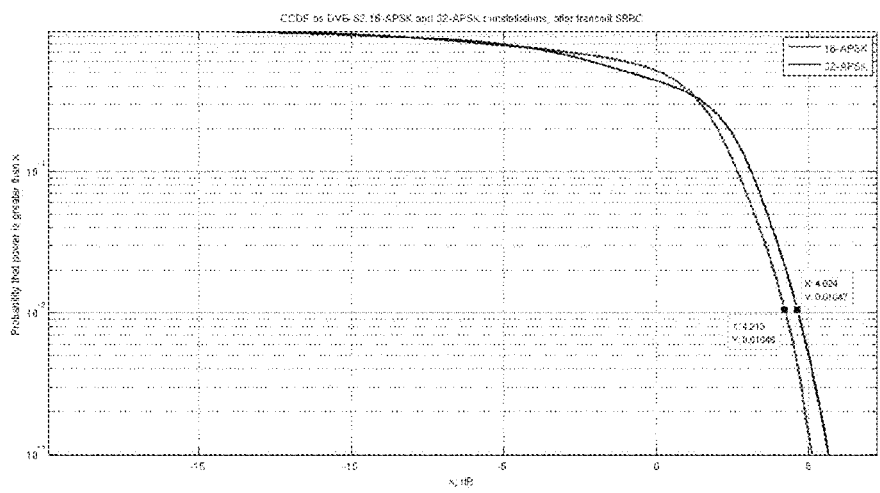
FIG. 10 shows, on the Y-axis is the probability that a 16-APSK or 32-APSK signal exceeds the power level indicated by the abscissa.

The ISI of 32-APSK is less than 16-APSK for the same average power, due to its large PAPR. FIG. 10 shows the complementary cumulative distribution function (CCDF) of 16-APSK and 32-APSK indicating the probability of a signal's instantaneous power where it exceeds a certain threshold. At $99^{th}$ percentile, 32-APSK's power exceeds that of 16-APSK by 0.4 dB.

Overshoot (PAPR) Increase Due to Sharp Roll-Off Pulse-Shaping

Figure 11A:
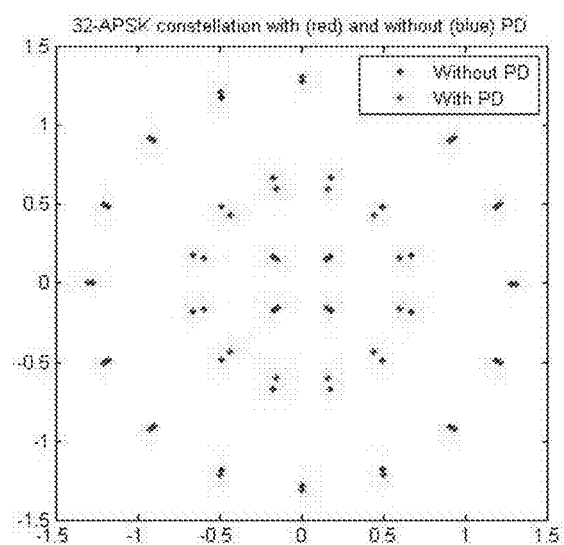
FIG. 11A shows the 32-APSK constellation with and without PD, plotted in a way that average power remains the same. The expansion in constellation PAPR due to the PD is shown in FIG. 11B.
Figure 11B:
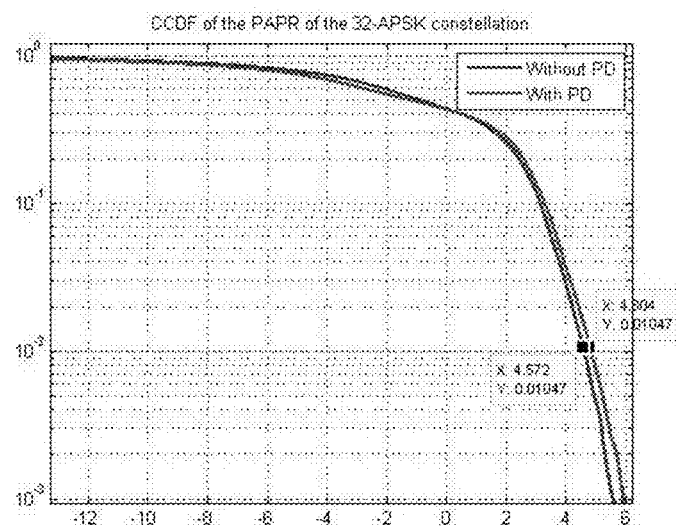

An additional back-off (3-5.5 dB) due to sharp roll-off SRRC pulse-shaping is required irrespective of PD. The transmit waveform will have a greater overshoot (PAPR) with PD than without it, as PD increases power. FIG. 11A shows 32-APSK with and without PD, in which the average power remains same. FIG. 11B shows the CCDF of PAPR of transmit waveforms with and without PD; with PD a 0.25 dB rise in PAPR is observed at the 99th percentile.

Transponder Out-of-Band Emission with and without a PD

In case of DVB-S2, modulation is memoryless, the mean of the constellation does not change the spectrum as it remains same even after PD. The variance of the constellation is a multiplicative factor on the signal spectrum. PD modifies the variance, but the signal's spectrum remains unchanged resulting in no additional out-of-band components in the uplink, (spectral regrowth), though their levels are higher by the ratio of the transponder output power.

On the downlink, out-of-band components will "regrow", due to large PAPR input to the transponder's PA, thereby exciting its non-linear modes. However, the satellite's output multiplexer (OMUX) filter suppresses them.

Figure 12:
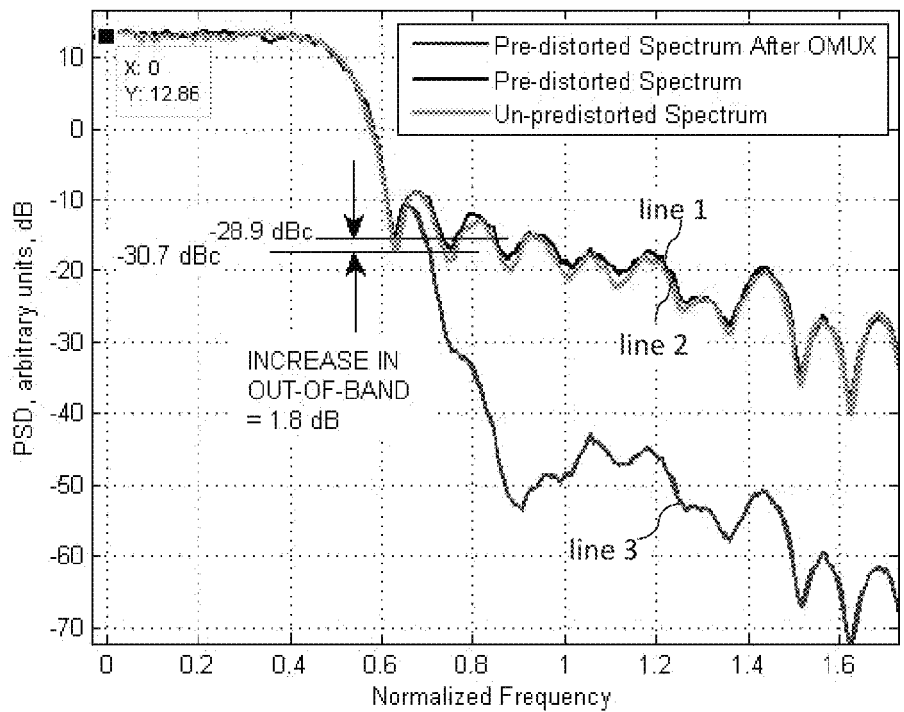
FIG. 12 shows a comparison of spectra at the output of the transponder with a SRRC, roll-off 5%

FIG. 12 shows the spectra at the output of the transponder, with 32 APSK, a SRRC roll-off of 5%, with (line 1) and without (line 2) PD. The increase of 1.8 dB (line 2 vs. line 1) in out-of-band due to PD is suppressed by the OMUX (line 3). Thus the out-of-band levels remain comparable without PD and conform to the ITU regulation (the out-of-band<−26 to −30 dBc).

Figure 13:
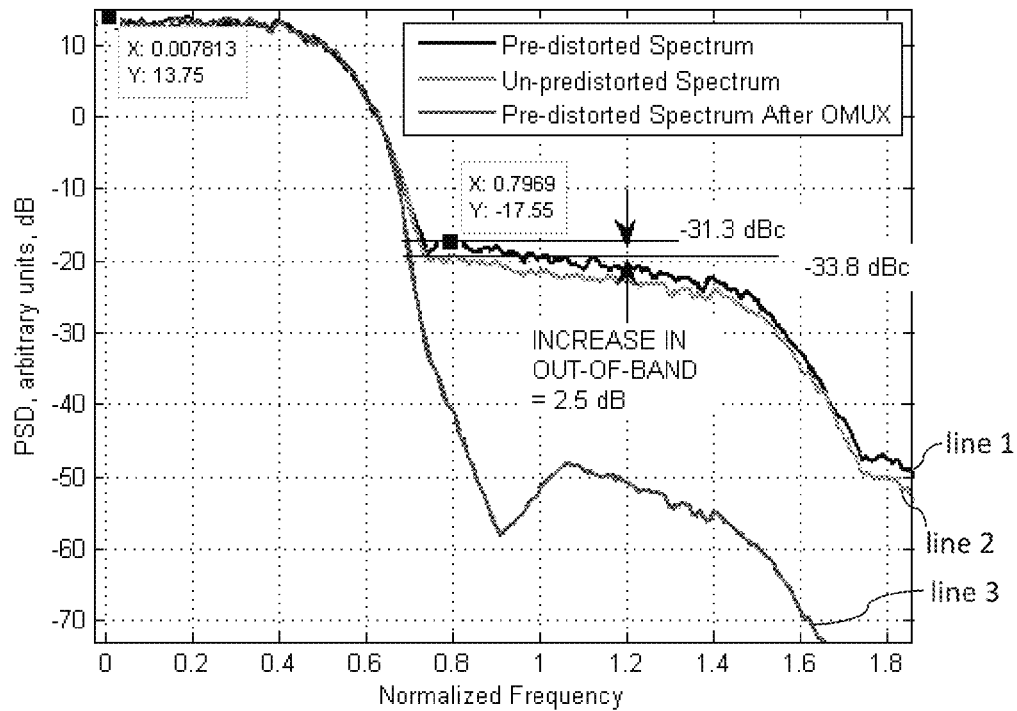
FIG. 13 shows a comparison of spectra at the output of the transponder with a SRRC, roll-off 35%.
Figure 14A:
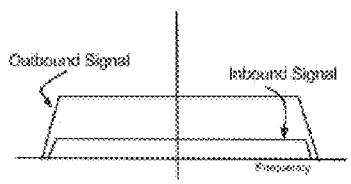
FIGS. 14A-14D shows several supported configurations all having a single carrier on the outbound, regardless of whether the inbound and outbound share the same band, and whether the inbound is time-division multiple access (TDMA) or frequency-division multiple access (FDMA)
Figure 14B:
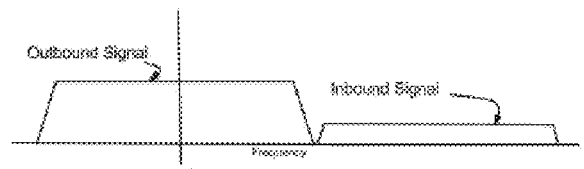
Figure 14C:
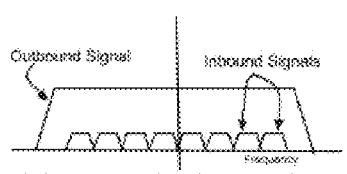
Figure 14D:
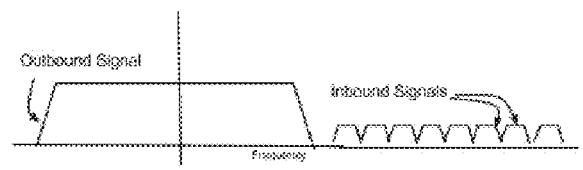

In FIG. 13 with a SRRC roll-off of 35%, the pre-distorted spectrum has higher out-of-band 2.5 dB) regrowth; this is due to increased PAPR with PD.

The in-band noise floor, which rises due to saturation (because of increased IM components), is observed only with large aperture (high G/T) receive antennas. Another practical issue is that the satellite operator may limit minimum amplifier back-off (based on user's antenna aperture in adjacent transponders) and this is monitored by the out-of-band spurious levels generated (by a large aperture antenna).

Implementation

System limitations that the design addresses are:
The PD is applied to the hub-transponder-remote system operating in a loopback beam, i.e., the hub and the remote earth stations are in the same satellite footprint.
The outbound signal is single carrier, i.e., the remote earth stations are addressed via time-division multiplexing. If the outbound signal comprises multiple carriers, inter modulation products are introduced by the transponder non-linearity. These cannot be eliminated by means of symbol-level PD. Hence we do not address the outbound multi-carrier case. Even in the case of single-carrier outbound, where the outbound and inbound signals share the same band, inter-modulation occurs between them, but the magnitude of the inter-modulation products is lower (due to the lower spectral density of the inbound signals).

FIGS. 14A-14D illustrate several supported configurations all having a single carrier on the outbound regardless of whether the inbound and outbound share the same band and regardless of whether the inbound is TDMA or FDMA. The outbound and the inbound signals at the hub may or may not occupy the same band but if they do then the receiver at the hub needs to cancel its own (possibly non-linearly distorted) echo.

Figure 15:
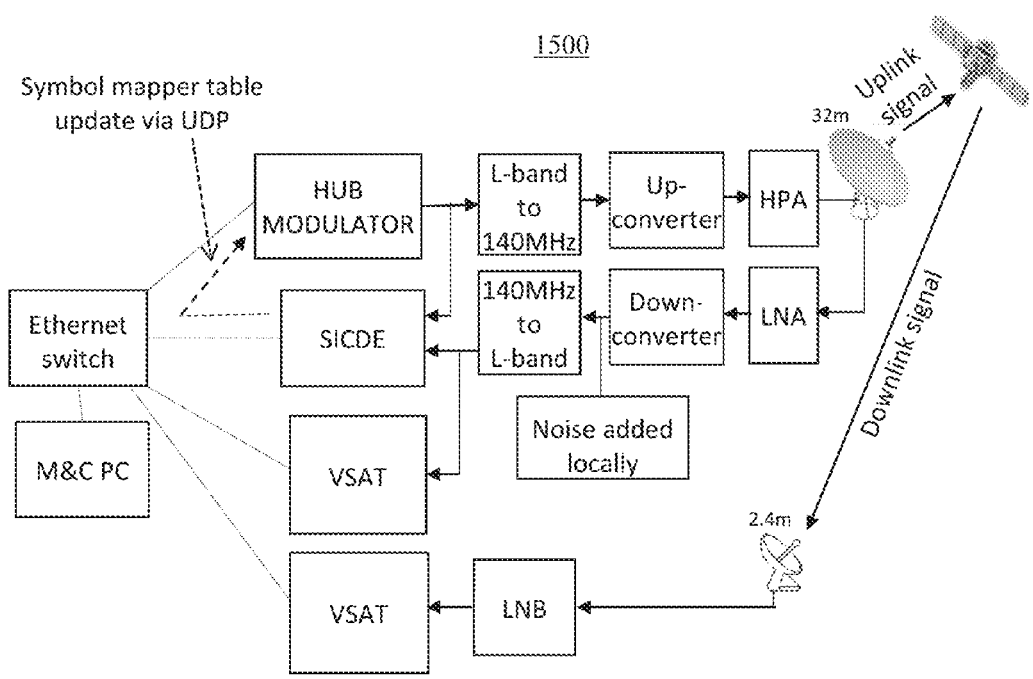
FIG. 15 shows an exemplary test setup of a satellite communication system.
Figure 16A:
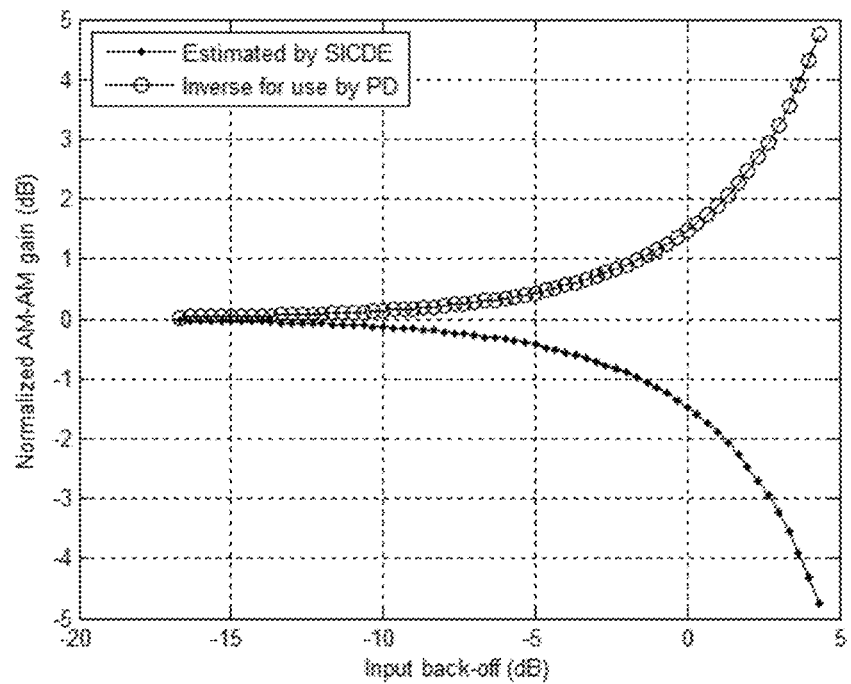
FIGS. 16A-16B shows an exemplary normalized AM-AM and AM-PM characteristics of transponder's PA estimated by the SICDE and corresponding inverse characteristics for PD.
Figure 16B:
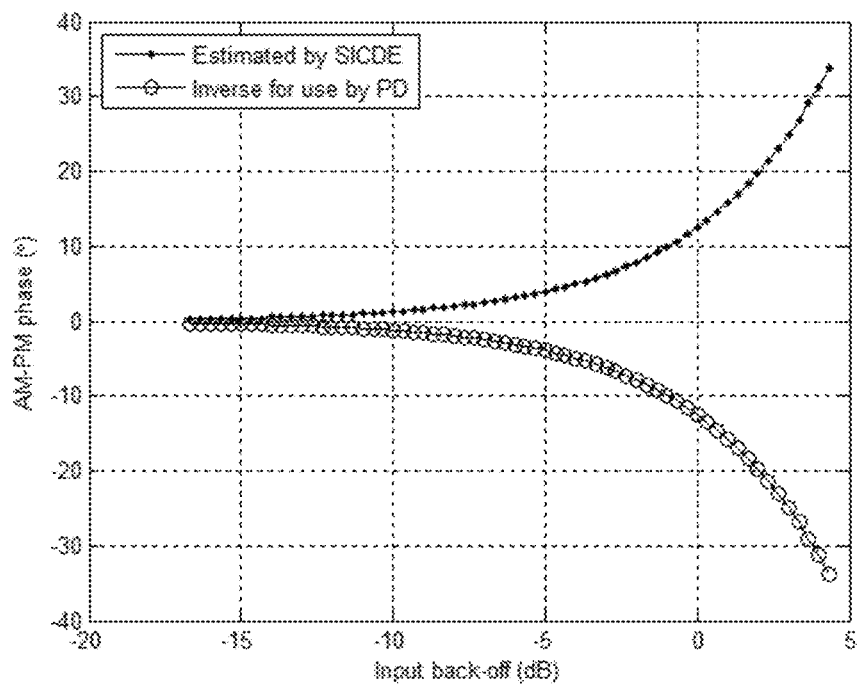
Figure 17:
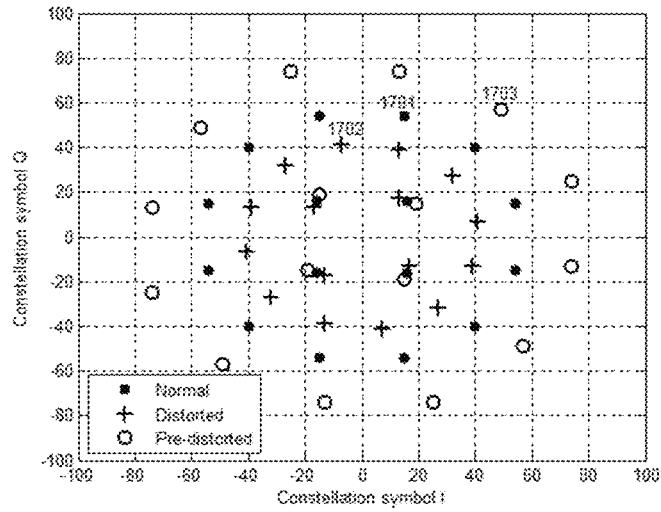
FIG. 17 shows an exemplary 16-APSK constellation under normal, distorted and pre-distorted conditions.

FIG. 15 illustrates how the PD is updated by the SICDE 210 estimate of AM-AM and AM-PM. The hub modulator 215 maintains a set of symbol tables for each MODCOD, which are used for modulation. The SICDE 210 estimates the transponder's PA normalized AM-AM and AM-PM characteristic, and determines an inverse. The inverse is used to generate pre-distorted symbol tables. FIGS. 16A and 16B illustrate SICDE estimated normalized AM-AM and AM-PM characteristics and the corresponding characteristics for PD obtained by the inverse operation. FIG. 17 illustrates a 16-APSK constellation for normal, distorted and pre-distorted cases. For example, the normal constellation point 1701 in the outer circle is distorted (suppressed and phase shifted, in the absence of any pre-distortion) to position 1702 after going through the PA 213. However, if the signal is pre-distorted by the PD 201, the pre-distorted constellation point 1703 when passed through the PA 213 would generate a normal constellation point at 1701. For pre-distortion, the average power of the constellation is indexed to 0 dB back-off point of the inverse AM-AM and AM-PM curves of FIGS. 16A, 16B. Relative power level of each constellation point with respect to average power is used to index the curves and obtain the corresponding amount of gain and phase shift required. The normal constellation point is then scaled in amplitude and shifted in phase, which is called pre-distortion. The SICDE 210 may provide the initial estimate of normalized AM-AM and AM-PM curves a predetermined period of time (e.g., 60 sec) after power On and subsequent updates may be provided periodically thereafter (e.g., every 5 sec) Accordingly, the pre-distorted symbol tables are communicated to hub system over Ethernet interface using User Datagram Protocol (UDP).

Interaction with Adaptive Coding and Modulation (ACM)

Hub and VSATs have a loop that increases or decreases the code-rate and modulation scheme based on measured SNR, so that the improvement in SNR due to the PD is reflected in the modulation and coding (MODCOD) selected. This provides a means for measuring throughput improvement due to PD.

Testing of an Embodiment

Test Set-Up

FIG. 15 shows an exemplary test setup of a satellite communication system 1500.

Test Equipment

Hub modulator: 1.17 GHz center frequency, 30 Msps, 20% roll-off, CCM.

VSATs: 1.17 GHz center frequency, 30 Msps.

SICDE: 36 MHz bandwidth, 1.17 GHz center frequency, Non-linear Distortion Compensation (NDC) On/Off, PD On/Off.

Measurements

TABLE 3

| | 16APSK-2/3 $E_s/N_0$ (dB) | | | | 16APSK-3/4 $E_s/N_0$ (dB) | | | |
|---|---|---|---|---|---|---|---|---|
| | Without PD | | With PD | | Without PD | | With PD | |
| Modulator TX level (dBm) | 32 m Antenna | 2.4 m VSAT | 32 m Antenna | 2.4 m VSAT | 32 m Antenna | 2.4 m VSAT | 32 m Antenna | 2.4 m VSAT |
| −10 | 17.9 | Unlock | 17.7 | Unlock | 17.9 | Unlock | 17.8 | Unlock |
| −9 | 18.8 | Unlock | 18.7 | Unlock | 18.7 | Unlock | 18.7 | Unlock |
| −8 | 19.7 | 9.0 | 19.6 | 9.0 | 19.6 | Unlock | 19.5 | Unlock |
| −7 | 20.5 | 9.8 | 20.3 | 9.9 | 20.4 | Unlock | 20.5 | Unlock |
| −6 | 21.1 | 10.7 | 21.1 | 10.9 | 21.1 | 10.5 | 21.2 | 10.7 |
| −5 | 21.3 | 11.3 | 21.4 | 11.6 | 21.2 | 11.1 | 21.3 | 11.4 |

The 32 m antenna measurements show that a 10 dB margin is present when transponder is saturated. Test at higher MODCOD and add a noise locally to simulate a low aperture antenna of about 13.5 m.

TABLE 4

| | 32APSK-5/6 | | | 32APSK-9/10 | |
|---|---|---|---|---|---|
| Modulator TX level (dBm) | Without PD local noise; floor OFF | Without PD local noise; floor ON | With PD local noise; floor ON | Without PD local noise; floor ON | With PD local noise; floor ON |
| −11 | 17.3 | 15.2 | 15.2 | Unlock | Unlock |
| −10 | 18.2 | 16.1 | 16.1 | Unlock | Unlock |
| −9 | 19.1 | 17.0 | 17.0 | Unlock | Unlock |
| −8 | 19.9 | 18.0 | 18.0 | Unlock | 18.2 |
| −7 | 20.5 | 18.6 | 18.8 | Unlock | 18.9 |
| −6 | 20.8 | 19.0 | 19.3 | Unlock | Unlock |
| −5 | 20.5 | 19.0 | 19.0 | Unlock | Unlock |

To the modest saturation of this test, PD showed an 8% gain in FLS-to-VSATs throughput. Even as higher throughput is recorded, out-of-band emission was observed to remain within the spectral mask. Table 4 shows the demodulator Es/No measurements recorded for the cases of without PD (hub modulator constellation not modified by SICDE estimated characteristics) and with (huh modulator constellation pre-distorted by SICDE estimated characteristics as in FIGS. 16A, 16B and 17) by controlling the modulator transmit level to operate in linear and saturation region of the transponder PA. Initial few rows show that demodulator Es/No incremented in nearly 1 dB steps for 1 dB increase in transmit power, hence they are the linear operating region measurements. The increment in Es/No started to have a droop as transmit power is further increased, indicating measurements in saturated operating region. The measurements of with PD case are similar to that of without PD case in linear region and better in the saturation region showing the gain due to PD. Tables 3 and 4 illustrate that the techniques described herein may not just be applied when transponder power is limited (i.e., it needs to be driven into saturation), but also in a regime where input back-off is insufficient to completely eliminate non-linearity.

Figure 18:
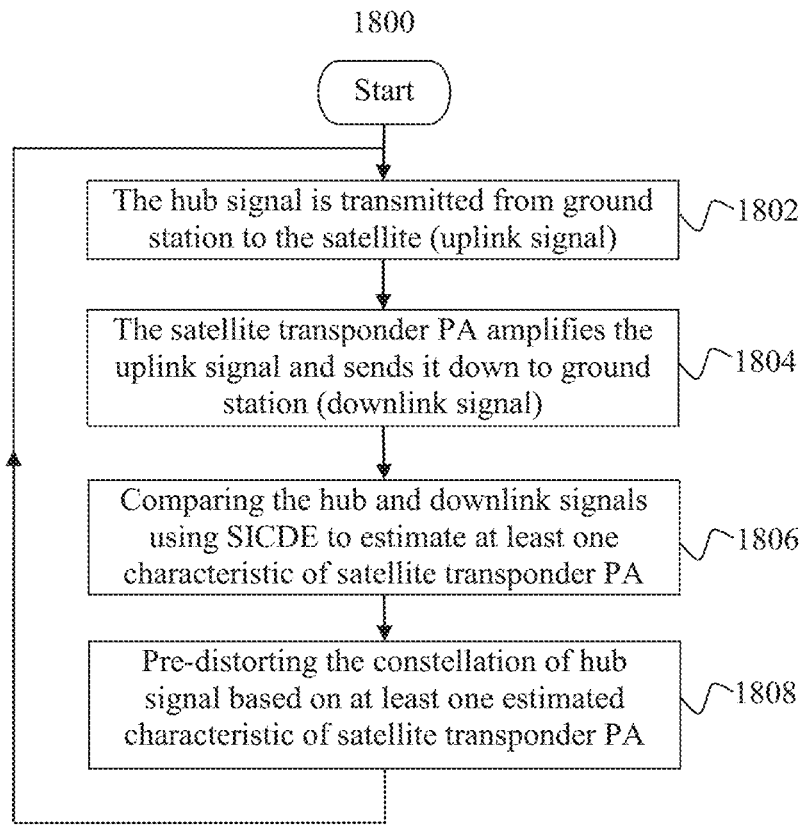
FIG. 18 is a flowchart illustrating an embodiment of a method for satellite communication.

FIG. 18 shows a flowchart 1800 for communication between a ground station and a satellite transponder. The ground station includes a hub modulator 215 (FIG. 1A), and the satellite transponder includes a satellite transponder PA 213 (FIG. 1A). At step 1802, the hub signal is transmitted from the ground station 200a to the satellite 200b. The satellite transponder's PA 213 amplifies the uplink signal and sends it down to the ground station as a downlink signal, step 1804. At step 1806, the SICDE 210 (FIG. 1A) compares the downlink signal A with the hub signal H from the hub modulator 215 to estimate the satellite transponder PA characteristics. Hub modulator's constellation is pre-distorted 201 (FIG. 1A) based on the estimated AM-AM and AM-PM characteristics (step 1808) to linearize the satellite transponder's PA.

One aspect of the present invention is that it is able to remotely estimate (via a self-interference canceling device, the SICDE 210) the AM-AM and AM-PM characteristics of the satellite's PA 213, and the pre-distortion is tightly coupled to the measurement provided by SICDE. The present invention does not require the satellite transponder's cooperation, does not require the satellite to transmit the transponder characteristics to the ground station, nor does it require any PD or other processing on the satellite. Furthermore, the PD 201 is able to adapt to changes to the satellite's PA characteristics (e.g., in Table 4, the PD is adapting to the PA characteristics, whereby the measurements with PD enabled are similar to that of without PD in linear region (i.e., at lower transmit power levels) and better than without PD near saturation region (i.e., at higher power levels). In addition, the satellite PA's 213 non-linearity need not be characterized during manufacture or pre-launch.

Accordingly, one embodiment of the invention includes the feature of remotely sensing the transponder's PA characteristic. Embodiments may employ the techniques such as adjusting the PD to the inverse of the most recent SICDE reading.

Further embodiments include features such as: baseband PD; PD being done in a manner that is the inverse, in amplitude, and negative, in phase, Satellite transponder's PA characteristics; adaptive pre-distortion; and/or features that characterize the precise componentry of the PD and the estimator.

The processes at the earth station is independent of the satellite, to allow the satellite and earth station manufacturers are different entities.

In a first embodiment of the invention, a ground station system is provided for use with a satellite communication system, wherein the ground station system is in a footprint of a satellite transponder having a satellite transponder power amplifier (PA). The ground station system comprises: a transmitter receiving an input hub signal, said transmitter having a pre-distorter that pre-distorts the input hub signal, wherein the pre-distorted hub signal is to be transmitted by the transmitter to the satellite transponder; a receiver configured to receive a downlink signal transmitted by the satellite transponder, wherein the downlink signal includes an amplification and distortion of the pre-distorted hub signal by the satellite transponder PA; and a self-interference canceller with distortion estimator (SICDE) configured to estimate the distortion by the satellite transponder PA and determine an inverse signal of the estimated distortion, wherein said pre-distorter receives the inverse signal and pre-distorts the input hub signal based on the inverse signal.

In a second embodiment that includes one or all of the prior embodiments, the satellite transponder is configured to transmit the downlink signal received by the receiver, wherein the footprint of the satellite transponder includes the ground station system. In a third embodiment that includes one or all of the prior embodiments, the satellite transponder PA does not comprise a pre-distorter. In a fourth embodiment that includes one or all of the prior embodiments, the satellite transponder PA comprises a traveling wave tube amplifier (TWTA). In a fifth embodiment that includes one or all of the prior embodiments, the ground station system falls within an intersection of transmit and receive footprints of the satellite transponder. In a sixth embodiment that includes one or all of the prior embodiments, the ground station system and the satellite transponder operate in loopback.

In a seventh embodiment that includes one or all of the prior embodiments, the pre-distortion is configured to adapt to changes to characteristics of the satellite transponder PA. In an eighth embodiment that includes one or all of the prior embodiments, the SICDE is configured to analyze the hub signal and the downlink signal, to estimate the PA distortion. In a ninth embodiment that includes one or all of the prior embodiments, the estimated distortion comprises at least one non-linear characteristic of the satellite transponder PA. In a tenth embodiment that includes one or all of the prior embodiments, the estimated distortion comprises AM-AM and/or AM-PM characteristics of the satellite transponder PA.

In an eleventh embodiment that includes one or all of the prior embodiments, said SICDE is further configured to remove the pre-distorted hub signal from the downlink signal. In a twelfth embodiment that includes one or all of the prior embodiments, the non-linear characteristic comprises phase or amplitude. In a thirteenth embodiment that includes one or all of the prior embodiments, the pre-distortion for the input hub signal uses a constellation that corresponds to an inverse, in amplitude, and negative, in phase, of the estimated at least one characteristic of the satellite transponder PA. In a fourteenth embodiment that includes one or all of the prior embodiments, the input hub signal comprises a constellation of symbols.

Embodiments are also directed to a method for satellite communication between a ground station system and a satellite transponder, wherein the ground station system includes a hub modulator, SICDE, and the satellite transponder includes a satellite transponder's PA. The method comprises comparing at the ground station system, the downlink signal amplified by the satellite transponder's PA and the hub signal which is generated by the hub modulator and that was transmitted to the satellite transponder from the ground station system. The method also comprises analyzing the comparison and estimating, using the SICDE, at least one characteristic of the satellite transponder's PA based on the analyses. The method further comprises generating a pre-distorted constellation, based on the estimated at least one characteristic of the satellite transponder's PA.

Each of the exemplary embodiments described above may be realized separately or in combination with other exemplary embodiments.

The foregoing description and drawings should be considered as illustrative only of the principles of the inventive concept. Exemplary embodiments may be realized in a variety of manners and are not intended to be limited by the preferred embodiments described above. Numerous applications of exemplary embodiments will readily occur to those skilled in the art Therefore, it is not desired to limit the inventive concept to the specific examples disclosed or the exact construction and operation shown and described. Rather, all suitable modifications and equivalents may be resorted to, falling within the scope of this application.

The invention claimed is:

1. A ground station system for use with a satellite communication system, wherein the ground station system is in a footprint of a satellite transponder having a satellite transponder power amplifier (PA), the ground station system comprising:

a transmitter receiving an input hub signal, said transmitter having a pre-distorter that pre-distorts the input hub signal to provide a pre-distorted hub signal, and a filter that receives the pre-distorted hub signal and limits spectral regrowth of the pre-distorted hub signal to provide a filtered pre-distorted hub signal, wherein the filtered pre-distorted hub signal is to be transmitted by the transmitter to the satellite transponder;

a receiver configured to receive a downlink signal transmitted by the satellite transponder, wherein the downlink signal includes a distorted hub signal that is an amplification and distortion of the filtered pre-distorted hub signal by the satellite transponder PA; and a self-interference canceller with distortion estimator (SICDE) configured to estimate a nonlinear characteristic of the satellite transponder PA based on the filtered pre-distorted hub signal and the downlink signal, wherein the estimated nonlinear characteristic includes at least one of amplitude and phase, wherein said pre-distorter receives the estimated nonlinear characteristic and pre-distorts the input hub signal by:

mapping an average value of a symbol constellation comprising a plurality of symbols to a 0 dB back-off point of the estimated nonlinear characteristic, using a relative power level of each symbol to lookup the estimated nonlinear characteristic, and modify each symbol by an inverse, in amplitude, and negative, in phase, of the respective value of the estimated nonlinear characteristic to generate a pre-distorted symbol constellation.

2. The ground station system of claim 1, wherein the ground station system falls within an intersection of transmit and receive footprints of the satellite transponder.

3. The ground station system of claim 1, wherein the ground station system and the satellite transponder operate in loopback.

4. The ground station system of claim 1, wherein the pre-distorter is configured to adapt to changes to characteristics of the satellite transponder PA.

5. The ground station system of claim 1, wherein the SICDE is configured to analyze the downlink signal with respect to the filtered pre-distorted hub signal to estimate the nonlinear characteristic.

6. The ground station system of claim 1, wherein the estimated nonlinear characteristic comprises AM-AM and/or AM-PM characteristics of the satellite transponder PA.

7. A method for satellite communication between a ground station system and a satellite transponder, wherein the ground station system has a transmitter and is in a footprint of a satellite transponder having a satellite transponder power amplifier (PA), the method comprising:

receiving at the ground station, an input hub signal;

pre-distorting, at the ground station, the input hub signal to provide a pre-distorted input hub signal;

filtering, at the ground station, the pre-distorted input hub signal to limit spectral regrowth of the pre-distorted input hub signal to provide a filtered pre-distorted hub signal;

transmitting, by the transmitter, the filtered pre-distorted hub signal to the satellite transponder;

receiving at the ground station, a downlink signal from the satellite transponder, wherein the downlink signal includes a distorted hub signal that is an amplification and distortion of the filtered pre-distorted hub signal by the satellite transponder PA; and estimating, by a self-interference canceller with distortion estimator (SICDE), a nonlinear characteristic of the satellite transponder PA based on the filtered pre-distorted hub signal and the downlink signal, wherein the estimated nonlinear characteristic includes at least one of amplitude and phase, wherein the step of pre-distorting further comprises:

mapping an average value of a symbol constellation comprising a plurality of symbols to a 0 dB back-off point of the estimated nonlinear characteristic, using a relative power level of each symbol to lookup the estimated nonlinear characteristic, and modify each symbol by an inverse, in amplitude, and negative, in phase, of the respective value of the estimated nonlinear characteristic to generate a pre-distorted symbol constellation.

8. The method of claim 7, wherein the ground station system and the satellite transponder operate in loopback.

9. The method of claim 7, wherein the pre-distorting adapts to changes to characteristics of the satellite transponder PA.

10. The method of claim 7, wherein the estimated nonlinear characteristic comprises AM-AM and/or AM-PM characteristics of the satellite transponder PA.

* * * * *